United States Patent
Kim

(10) Patent No.: US 10,833,516 B2
(45) Date of Patent: Nov. 10, 2020

(54) CHARGING PORT MODULE FOR MOBILE ELECTRONIC DEVICE AND MOBILE ELECTRONIC DEVICE INCLUDING CHARGING PORT MODULE

(71) Applicant: Samsung Electronics Co., Ltd., Suwon-si (KR)

(72) Inventor: Hajin Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/848,588

(22) Filed: Dec. 20, 2017

(65) Prior Publication Data

US 2018/0366960 A1 Dec. 20, 2018

(30) Foreign Application Priority Data

Jun. 15, 2017 (KR) .................. 10-2017-0075819

(51) Int. Cl.
| | |
|---|---|
| *H02J 7/00* | (2006.01) |
| *H01R 31/06* | (2006.01) |
| *H01R 13/66* | (2006.01) |
| *H01R 13/03* | (2006.01) |
| *H01R 24/62* | (2011.01) |

(52) U.S. Cl.
CPC ........ *H02J 7/0027* (2013.01); *H01R 13/6616* (2013.01); *H01R 31/065* (2013.01); *H02J 7/0042* (2013.01); *H01R 13/03* (2013.01); *H01R 24/62* (2013.01); *H02J 7/00* (2013.01)

(58) Field of Classification Search
None
See application file for complete search history.

(56) References Cited

U.S. PATENT DOCUMENTS

| | | | | |
|---|---|---|---|---|
| 5,415,572 | A | * | 5/1995 | Shepherd ............ A47J 27/2105 219/392 |
| 5,580,275 | A | * | 12/1996 | Bozek ................ H01R 13/2421 213/1.3 |
| 8,625,977 | B2 | | 1/2014 | Cheung |
| 8,760,116 | B2 | | 6/2014 | Fujii |
| 8,926,933 | B2 | * | 1/2015 | Zhang .................... B82Y 10/00 423/447.3 |
| 2009/0011616 | A1 | * | 1/2009 | Patwardhan ......... H01R 13/629 439/34 |
| 2009/0272728 | A1 | * | 11/2009 | Abbott ...................... F24C 7/04 219/399 |
| 2010/0122980 | A1 | * | 5/2010 | Wang ..................... H05B 3/145 219/553 |
| 2014/0238250 | A1 | * | 8/2014 | Gephart .............. A47J 36/2494 99/483 |

(Continued)

FOREIGN PATENT DOCUMENTS

| | | |
|---|---|---|
| JP | 1174032 A | 3/1999 |
| JP | 3006189 B2 | 11/1999 |

(Continued)

*Primary Examiner* — Tho D Ta
(74) *Attorney, Agent, or Firm* — Cantor Colburn LLP

(57) ABSTRACT

A charging port module for a mobile electronic device and a mobile electronic device including the charging port module. The charging port module includes a housing including at least one opening; a heating element disposed on the housing; and a plurality of electrodes contacting the heating element.

17 Claims, 13 Drawing Sheets

(56) References Cited

U.S. PATENT DOCUMENTS

2015/0312967 A1* 10/2015 Qian .................. H05B 3/145
219/203
2016/0064854 A1* 3/2016 Schooley ........... H01R 13/2421
439/39

FOREIGN PATENT DOCUMENTS

| JP | 2001198086 A | 7/2001 |
|----|--------------|---------|
| KR | 101058079 B1 | 8/2011 |
| KR | 101199914 B1 | 11/2012 |
| KR | 1020130136290 A | 12/2013 |

* cited by examiner

FI8. 8A
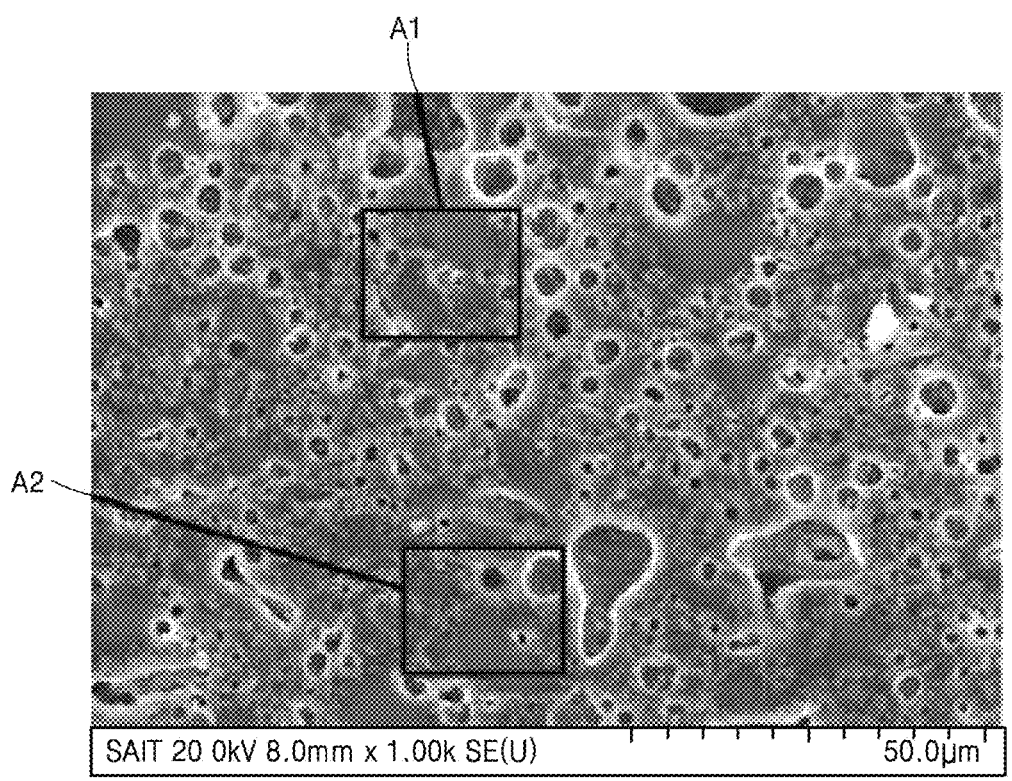

CHARGING PORT MODULE FOR MOBILE ELECTRONIC DEVICE AND MOBILE ELECTRONIC DEVICE INCLUDING CHARGING PORT MODULE

CROSS-REFERENCE TO RELATED APPLICATION

This application claims the benefit of and priority to Korean Patent Application No. 10-2017-0075819, filed on Jun. 15, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a charging port module for a mobile electronic device and a mobile electronic device including the charging port module.

2. Description of the Related Art

In accordance with the increasing use of mobile electronic devices such as smart phones, notebooks, and tablet personal computers ("PCs"), waterproofing functions are being added to mobile electronic devices to enable their use even in a pool or rainy weather. In addition, if water is present in the charging port of a mobile electronic device, a mishap such as a short circuit may occur when the mobile electronic device is charged. In order to prevent these accidents, a function of detecting a small amount of water or moisture present in the charging port and shutting off charging or operation is employed in mobile electronic devices.

SUMMARY

Provided is a charging port module for a mobile electronic device, the charging port module capable of removing water remaining in the charging port in a short period of time.

Provided is a mobile electronic device including the charging port module for a mobile electronic device.

Additional aspects will be set forth in part in the description which follows and, in part, will be apparent from the description, or may be learned by practice of the presented embodiments.

According to an aspect of an embodiment, a charging port module for a mobile electronic device includes a housing including at least one opening; a heating element disposed on the housing; and a plurality of electrodes contacting the heating element.

According to an aspect of an embodiment, a mobile electronic device includes the charging port module for a mobile electronic device.

BRIEF DESCRIPTION OF THE DRAWINGS

These and/or other aspects will become apparent and more readily appreciated from the following description of the embodiments, taken in conjunction with the accompanying drawings in which:

FIGS. 8A to 8C are SEM images of a heating element prepared in Comparative Example 1;

DETAILED DESCRIPTION

Figure 1A:
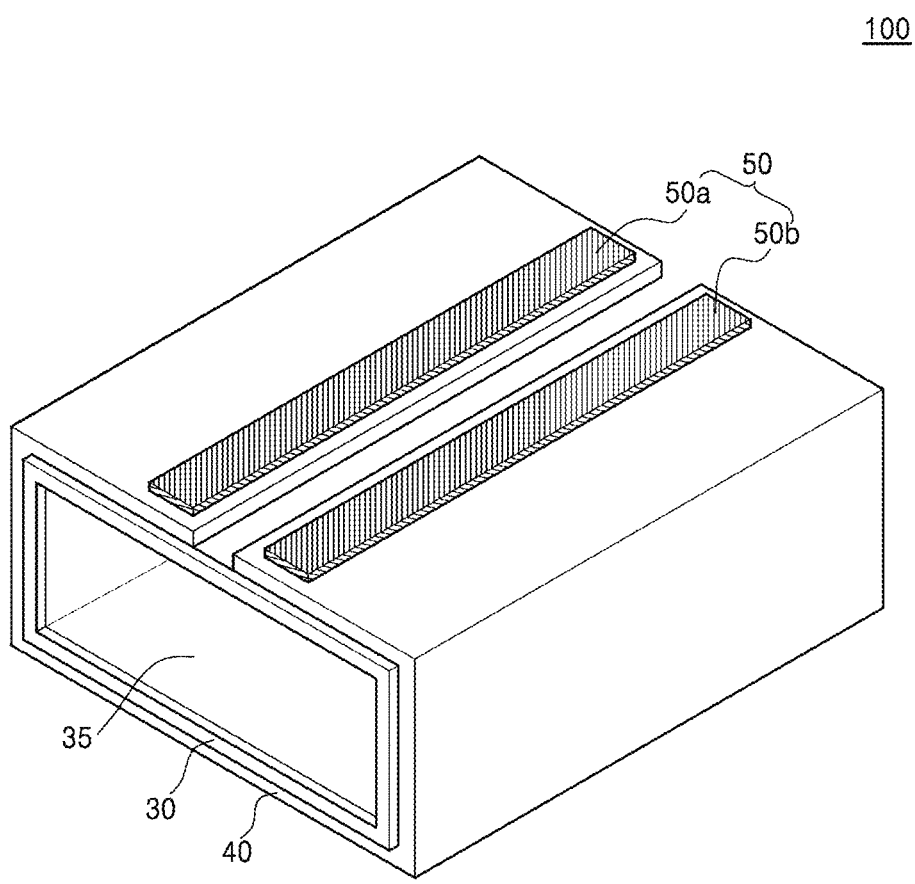
FIG. 1A is a schematic view of an embodiment of a charging port module for a mobile electronic device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Thicknesses of several layers and regions in the drawings may be exaggerated for convenience of explanation. Throughout the specification, like reference numerals in the drawings denote like elements. Throughout the specification, it will be understood that when a component, such as a layer, a film, a region, or a plate, is referred to as being "on" another component, the component can be directly on the other component or intervening components may be present thereon. Throughout the specification, while such terms as "first," "second," etc., may be used to describe various components, such components must not be limited to the above terms. The above terms are used only to distinguish one component from another.

When water is present in the charging port of a mobile electronic device, charging or operation of the mobile electronic device is interrupted, and thus rapid drying of the charging port is required.

Hereinafter, a charging port module for a mobile electronic device and a mobile electronic device including the charging port module, according to example embodiments, will be described in detail.

Figure 1B:
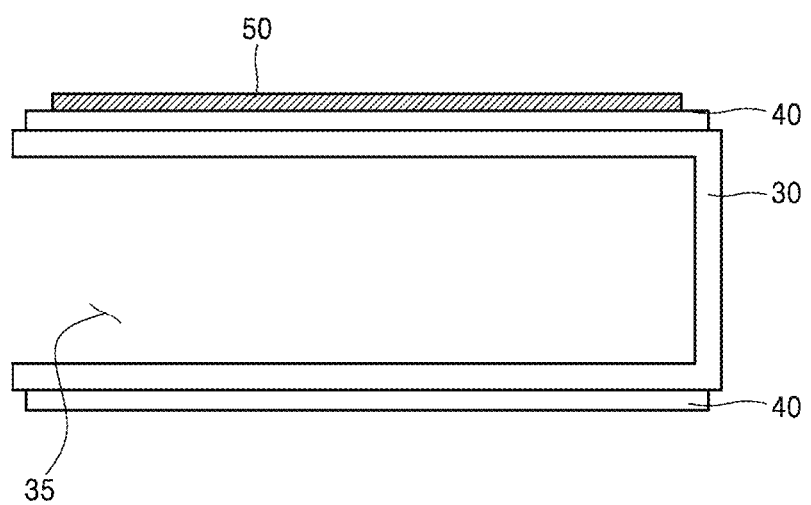
FIG. 1B is a schematic cross-sectional view of an embodiment of the charging port module for a mobile electronic device.

Referring to FIGS. 1A and 1B, a charging port module 100 according to an embodiment includes a housing 30 including at least one opening 35; a heating element 40 disposed on the housing 30; and a plurality of electrodes 50 (50a and 50b) contacting the heating element 40.

When electrical energy is supplied from an internal power source such as a battery of a mobile electronic device through the plurality of electrodes 50 (50a and 50b), the heating element 40 may generate heat, which may increase a temperature of the housing 30, and thus water present inside the housing 30 may be removed. As a result, water inside the charging port module 100 for a mobile electronic device may be removed.

Figure 2:
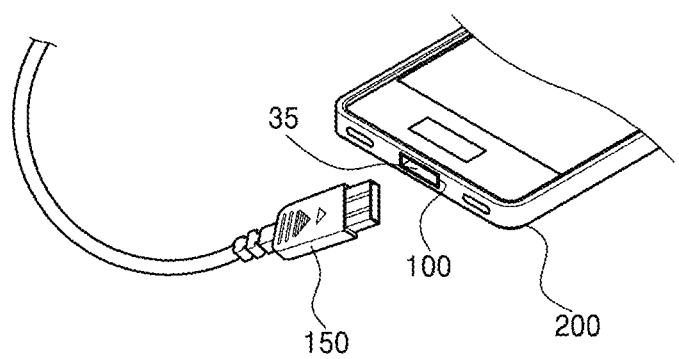
FIG. 2 is a schematic view of an embodiment of a mobile electronic device including a charging port and a charging cable that supplies power to the mobile electronic device.

Referring to FIG. 2, a charging cable 150 that supplies external power may be connected to the charging port module 100 via the opening 35 of the housing 30 to charge a mobile electronic device 200. The housing 30 may further have an internal structure that includes terminals contacting the charging cable 150, but a description of the internal structure is omitted for convenience of explanation. When water is present inside the charging port module 100, problems such as a short circuit may occur, and thus the device may not be charged by using via the charging cable 150, but the charging may be performed if water remaining in the charging port module 100 for a mobile electronic device is rapidly removed by heating. A sensor for detecting the presence of water may be additionally included in the charging port module 100 for a mobile electronic device or inside the housing 30. When water is detected by the sensor, electrical energy may be supplied to the heating element 40.

Referring to FIGS. 1A and 1B, a current supplied to the plurality of electrodes 50 (50a and 50b) in the charging port module 100 for a mobile electronic device may be about 1 amp (A) or lower, about 0.8 A or lower, about 0.6 A or lower, about 0.4 A or lower, about 0.2 A or lower, about 0.1 A or lower, about 0.08 A or lower, about 0.06 A or lower, about 0.04 A or lower, about 0.02 A or lower, or about 0.01 A or lower. A current supplied to the plurality of electrodes 50 (50a and 50b) may be about 0.001 A or higher. When the current supplied to the plurality of electrodes 50 (50a and 50b) is excessively high, excessively increased energy is consumed to remove water, and time of use of a mobile electronic device including a battery may significantly decrease. Also, a voltage applied to the plurality of electrodes 50 (50a and 50b) may be about 24 volts (V) or lower, about 20 V or lower, about 15 V or lower, about 10 V or lower, about 9 V or lower, about 8 V or lower, about 7 V or lower, about 6 V or lower, about 4.5 V or lower, about 4 V or lower, about 3.5 V or lower, about 3 V or lower, about 2.5 V or lower, about 2 V or lower, about 1.5 V or lower, or about 1 V or lower. A voltage applied to the plurality of electrodes 50 (50a and 50b) may be about 0.1 V or higher. Stated otherwise, in embodiments, the plurality of electrodes may be configured to have about 1 amp or lower supplied to the plurality of electrodes and about 24 volts or lower applied to the plurality of electrodes. When the voltage applied to the plurality of electrodes 50 (50a and 50b) is excessively high, a safety accident such as a short circuit caused by overcurrent may occur.

In the charging port module 100 for a mobile electronic device, an electrical power required to remove 99.9 volume percent (vol %) or more of water introduced to the inside of the housing 30 via the opening 35 may be about 10 W or lower, about 8 W or lower, about 6 W or lower, about 4 W or lower, about 2 W or lower, about 1 W or lower, about 0.5 W or lower, or about 0.1 W or lower. When the electrical power that is consumed to remove water is excessively high, a time of use of a mobile electronic device including a battery may significantly decrease. Also, a time required to remove 99.9 vol % or more of water introduced to the inside of the housing 30 via the opening 35 may be about 60 seconds or less, about 50 seconds or less, about 40 seconds or less, about 30 seconds or less, about 20 seconds or less, or about 10 seconds or less. Stated otherwise, in embodiments, the charging port module may be configured such that an electrical power of about 10 watts or lower applied to the charging port module for a time of about 60 seconds or less removes 99.9 volume percent or more of water introduced to an inside of the housing through the at least one opening. In the charging port module 100 for a mobile electronic device, a region contacting water introduced into the charging port through the opening 35 may be heated and a region not contacting water may not be heated.

In the charging port module 100 for a mobile electronic device, a highest temperature of the housing 30 that is heated by heat generated by the heating element 40 may be about 150° C. or lower, about 100° C. or lower, about 95° C. or lower, about 90° C. or lower, about 85° C. or lower, about 80° C. or lower, about 75° C. or lower, about 70° C. or lower, about 65° C. or lower, about 55° C. or lower, or about 50° C. or lower. When the highest temperature of the housing 30 is excessively high, a mobile electronic device close to the charging port module 100 may deteriorate. In the charging port module 100 for a mobile electronic device, relative to an ambient temperature, a lowest temperature of the housing 30 that is heated by heat generated by the heating element 40 may be about 30° C. or higher, about 35° C. or higher, about 40° C. or higher, about 45° C. or higher, about 50° C. or higher, about 55° C. or higher, about 60° C. or higher, about 65° C. or higher, about 70° C. or higher, about 75° C. or higher, or about 80° C. or higher. When a temperature difference between the temperature of the housing 30 and an ambient temperature is about 30° C. or higher, water may be easily removed.

In the charging port module 100 for a mobile electronic device, a thermal capacity of the housing 30 may be smaller than a thermal capacity of water. When a thermal capacity of the housing 30 is excessively greater than a thermal capacity of water, too much energy is consumed in removing a certain amount of water, and the removal may take a long time. For example, when a thermal capacity of water present in the housing 30 is 0.37 joule per kelvin (J/K), a thermal capacity of the housing 30 may be about 0.36 J/K or lower, about 0.33 J/K or lower, about 0.30 J/K or lower, about 0.28 J/K or lower, about 0.25 J/K or lower, or about 0.20 J/K or lower.

Figure 3:
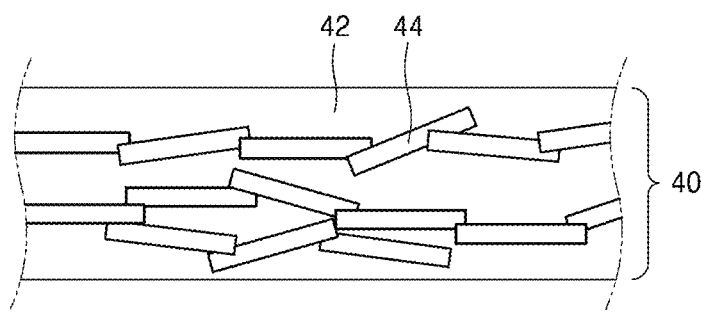
FIG. 3 is an enlarged schematic cross-sectional view of an embodiment of a heating element.

Referring to FIGS. 1A, 1B, and 3, the charging port module 100 for a mobile electronic device includes the heating element 40, and the heating element 40 may include a matrix material 42 and a plurality of particulate fillers 44. The plurality of fillers 44 may include fillers 44 having a nanostructure. The fillers 44 may have a 1-dimension nanostructure or a 2-dimension nanostructure. The 1-dimension nanostructure refers to a nanostructure having a shape defined by one dimension. For example, the 1-dimension nanostructure may denote a nanostructure, although it has three dimensions, where a length of one dimension is significantly greater than those of the other two dimensions, and the whole size of the nanostructure is determined by the length of the one dimension, such as a rod shape. The 2-dimension nanostructure refers to a nanostructure having a shape defined by two dimensions. For example, the 2-dimension nanostructure may denote a nanostructure, although it has three dimensions, where lengths of two dimensions are significantly greater than that of the other one dimension, and the whole size of the nanostructure is determined by the lengths of the two dimensions, such as a plate shape.

In some embodiments, the heating element 40 may be prepared by using a composite, and the composite may be prepared by mixing a glass frit, which forms a matrix, and the fillers 44, which are exothermic. In this case, the fillers 44 may contact each other so that electricity may flow through the fillers 44, and thus heat may be generated. In other embodiments, the heating element 40 may be prepared by using a ceramic material, and, conventionally, a spherical or polyhedral 3-dimensional structure has been used. For example, $RuO_2$ particles of a spherical or polyhedral form have been used as fillers. When $RuO_2$ particles of such forms are used, entire surfaces of glass frit particles may need to be theoretically covered with the $RuO_2$ particles, which may allow percolation between the $RuO_2$ particles, and thus heat may be stably generated. However, when the $RuO_2$ particles having a spherical or polyhedral form are used as fillers, a surface area of the $RuO_2$ particles contacting each other may be small, and thus a high temperature is required for sintering of the $RuO_2$ particles, and an amount of $RuO_2$ required for percolation may increase. On the other hand, when the heating element 40 including the fillers 44 having a nanostructure as described herein is used, percolation may easily occur, and a sintering temperature may be lowered, compared to when conventional fillers are used. An example of a nanomaterial may be a nano-sheet. A surface of the matrix material 42 may be covered with a small amount of the nano-sheet, and a surface of the nano-sheet may contact a neighboring nano-sheet. Thus, a sintering property may be improved. Due to such characteristics, electrical conductivity may increase when the fillers 44 having a nanostructure are used, compared to when the conventional $RuO_2$ particles are used as fillers in the same amount.

The heating element 40 may include the matrix material 42 and the plurality of fillers 44 having a nanostructure but may further include other components. The fillers 44 that are adjacent in a horizontal or vertical direction among the plurality of fillers 44 may be directly contacting each other, and surfaces of at least some regions of the adjacent fillers 44 may contact each other. In this regard, the fillers 44 evenly distributed in the matrix material 42 may be electrically connected, and the heating element 40 may have electrical conductivity. Since the surfaces of the adjacent fillers 44 contact each other, the electrical conductivity may easily increase, compared to when conventional particle fillers are used. Therefore, when an amount of the fillers 44 having a nanostructure distributed in the matrix material 42 is the same as an amount of conventional particle fillers, electrical conductivity of the heating element 40 may be greater than that of the heating element 40 prepared by using the conventional particle fillers.

The matrix material 42 and the plurality of fillers 44 may be mixed to form the heating element 40 in the form of a single layer. An additional layer, e.g., an upper layer between the heating element 40 and the electrode 50 (not shown) may be further prepared on the heating element 40, and the additional, e.g., upper layer (not shown) may include a single layer or multiple layers. A whole unit including a substrate 30, the heating element 40, and the optional additional, e.g., upper layer (not shown) may also be referred to as the heating element 40.

For example, the fillers 44 may be in the form of nano-sheets or nano-rods. Fillers having nano-sheet forms and fillers having nano-rod forms may include nano-sheets or nano-rods of various materials. The fillers 44 having a nano structure may have an electrical conductivity of about 1000 siemens per meter (S/m) or higher, about 1100 S/m or higher, about 1200 S/m or higher, or about 1250 S/m or higher.

The fillers 44 may include a metal, a carbonaceous material, an oxide, a boride, a carbide, a chalcogenide, or a combination thereof.

Examples of the metal included in the fillers 44 may include copper, silver, tungsten, nickel-chrome alloy, or a combination thereof. The metal may be in the form of a powder in the fillers, or in the form of a nanorod or a nanosheet.

Examples of the carbonaceous material included in the fillers 44 may include carbon black, carbon nanotubes, carbon nanofibers, graphene, a graphene oxide, or a combination thereof.

Examples of the oxide included in the fillers 44 may include an indium tin oxide ("ITO"), $RuO_{(2+x)}$ (where $0 \leq x \leq 0.1$), $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or a combination thereof.

Examples of the boride included in the fillers 44 may include $Ta_3B_4$, $Nb_3B_4$, $TaB$, $NbB$, $V_3B_4$, $VB$, or a combination thereof.

Examples of the carbide included in the fillers 44 may include $Dy_2C$ or $Ho_2C$, or a combination thereof.

Examples of the chalcogenide included in the fillers 44 may include $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or a combination thereof.

Among materials that may be included in the fillers 44 of the heating element 40, some of the materials having an electrical conductivity ($\sigma$) of at least 1,250 S/m are shown in Tables 1 to 3. Table 1 shows oxide filler materials, Table 2 shows boride and carbide filler materials, and Table 3 shows chalcogenide filler materials.

TABLE 1

| Composition | S/m | Composition | S/m |
| --- | --- | --- | --- |
| $RuO_2$ | $3.55 \times 10^6$ | $NbO_2$ | $3.82 \times 10^6$ |
| $MnO_2$ | $1.95 \times 10^6$ | $WO_2$ | $5.32 \times 10^6$ |
| $ReO_2$ | $1.00 \times 10^7$ | $GaO_2$ | $2.11 \times 10^6$ |
| $VO_2$ | $3.07 \times 10^6$ | $MoO_2$ | $4.42 \times 10^6$ |
| $OsO_2$ | $6.70 \times 10^6$ | $InO_2$ | $2.24 \times 10^6$ |
| $TaO_2$ | $4.85 \times 10^6$ | $CrO_2$ | $1.51 \times 10^6$ |
| $IrO_2$ | $3.85 \times 10^6$ | $RhO_2$ | $3.10 \times 10^6$ |

TABLE 2

| Material | Composition | $\sigma$ (S/m) |
| --- | --- | --- |
| Boride | $Ta_3B_4$ | 2335000 |
|  | $Nb_3B_4$ | 3402000 |
|  | $TaB$ | 1528800 |
|  | $NbB$ | 5425100 |
|  | $V_3B_4$ | 2495900 |
|  | $VB$ | 3183200 |
| Carbide | $Dy_2C$ | 180000 |
|  | $Ho_2C$ | 72000 |

TABLE 3

| Composition | $\sigma$ (S/m) | Composition | $\sigma$ (S/m) |
| --- | --- | --- | --- |
| $AuTe_2$ | 433000 | $TiSe_2$ | 114200 |
| $PdTe_2$ | 3436700 | $TiTe_2$ | 1055600 |
| $PtTe_2$ | 2098000 | $ZrTe_2$ | 350500 |
| $YTe_3$ | 985100 | $HfTe_2$ | 268500 |
| $CuTe_2$ | 523300 | $TaSe_2$ | 299900 |
| $NiTe_2$ | 2353500 | $TaTe_2$ | 444700 |
| $IrTe_2$ | 1386200 | $TiS_2$ | 72300 |
| $PrTe_3$ | 669000 | $NbS_2$ | 159100 |
| $NdTe_3$ | 680400 | $TaS_2$ | 81000 |
| $SmTe_3$ | 917900 | $Hf_3Te_2$ | 962400 |
| $GdTe_3$ | 731700 | $VSe_2$ | 364100 |
| $TbTe_3$ | 350000 | $VTe_2$ | 238000 |
| $DyTe_3$ | 844700 | $NbTe_2$ | 600200 |
| $HoTe_3$ | 842000 | $LaTe_2$ | 116000 |
| $ErTe_3$ | 980100 | $LaTe_3$ | 354600 |
| $CeTe_3$ | 729800 | $CeTe_2$ | 55200 |

A thickness of each of the fillers (i.e., a thickness of the nanorods or the nanosheets) 44 may be in a range of, for example, about 1 nanometers (nm) to about 1,000 nm, about 1 nm to about 900 nm, about 1 nm to about 800 nm, about 1 nm to about 700 nm, about 1 nm to about 600 nm, about 1 nm to about 500 nm, about 1 nm to about 400 nm, about 1 nm to about 300 nm, about 1 nm to about 200 nm, about 1 nm to about 100 nm, about 1 nm to about 80 nm, about 1 nm to about 60 nm, about 1 nm to about 40 nm, about 1 nm to about 20 nm, or about 1 nm to about 10 nm. When the thickness of each of the fillers 44 is too small, the fillers 44 may agglomerate together. When the thickness of the fillers 44 is too large, physical properties of the fillers 44 may be similar to those of a conventional filler.

A length of each of the fillers (i.e., a length of the nanorods or the nanosheets) 44 may be in a range of, for example, about 0.1 micrometers (μm) to about 500 μm, about 0.1 μm to about 400 μm, about 0.1 μm to about 300 μm, about 0.1 μm to about 200 μm, about 0.1 μm to about 100 μm, about 0.1 μm to about 80 μm, about 0.1 μm to about 60 μm, about 0.1 μm to about 40 μm, about 0.1 μm to about 20 μm, about 0.1 μm to about 10 μm, about 0.1 μm to about 8 μm, about 0.1 μm to about 6 μm, about 0.1 μm to about 4 μm, or about 0.1 μm to about 2 μm. When the length of each of the fillers 44 is too short, the fillers 44 may not have a nano-sheet or nano-rod structure. When the length of each of the fillers 44 is too long, physical properties of the fillers 44 may be similar to those of conventional fillers. The length of the fillers 44 denotes a maximum distance between two terminals of the fillers 44.

An amount of the fillers 44 in the heating element 40 may be in a range of, for example, about 0.1 volume percent (vol %) to lower than about 100 vol %, about 0.1 vol % to about 90 vol %, about 0.1 vol % to about 80 vol %, about 0.1 vol % to about 70 vol %, about 0.1 vol % to about 60 vol %, about 0.1 vol % to about 50 vol %, about 0.1 vol % to about 40 vol %, about 0.1 vol % to about 30 vol %, about 0.1 vol % to about 20 vol %, or about 0.1 vol % to about 10 vol %, based on the total volume of the heating element 40.

The matrix material 42 may include a ceramic material. The matrix material 42 may include a glass frit as a ceramic material. For example, the glass frit may include an oxide such as a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof. The glass frit may be prepared by adding an additive to a silicon oxide. The additive may include lithium (Li), nickel (Ni), cobalt (Co), boron (B), potassium (K), aluminum (Al), titanium (Ti), manganese (Mn), copper (Cu), zirconium (Zr), phosphorus (P), zinc (Zn), bismuth (Bi), lead (Pb), sodium (Na), or a combination thereof. The additive is not limited to these elements. The glass frit may include or be in the form of an enamel, i.e., an opaque or semitransparent glassy substance.

The matrix material 42 may include a heat-resistant organic material. For example, the matrix material 42 may include an organic polymer. A melting temperature ($T_m$) of the organic polymer may be, for example, about 200° C. or higher. A glass transition temperature ($T_g$) of the organic polymer may be, for example, about 100° C. or higher. For example, the organic polymer may include polysiloxane ("PS"), polyimide ("PI"), polyphenylenesulfide ("PPS"), polybutylene terephthalate ("PBT"), polyamideimide ("PAI"), liquid crystalline polymer ("LCP"), polyethylene terephthalate ("PET"), polyetheretherketone ("PEEK"), or a combination thereof, but embodiments are not limited thereto, and any material that is available as a matrix material of a heating element in the art may be used.

Referring to FIGS. 1A and 1B, the heating element 40 may be a sheet-type heating element 40. It is to be understood that a sheet-type heating element can have a two-dimensional profile that conforms to an underlying two-dimensional profile, The heating element 40 may undergo a series of processes, for example, a coating process and a drying process, and may be patterned or coated on an outer surface of the housing 30. In some embodiments, the heating element 40 may be prepared separately and then disposed on the housing 30. A shape of the sheet-type heating element 40 is not particularly limited and may be disposed with a predetermined pattern according to a shape of the housing 30 being used and the required heating location. For example, when the housing 30 has a plurality of openings 35, the sheet-type heating element 40 may be selectively disposed on regions other than those including the openings 35. A portion of or a whole surface of the housing 30 may be coated with the sheet-type heating element 40, and a single sheet-type heating element 40 or a plurality of sheet-type heating elements 40 may be disposed on the housing 30. When the sheet-type heating element 40 is disposed on the housing 30, a temperature of the housing 30 may increase evenly. Therefore, as compared to a rod-type heating element, the sheet-type heating element 40 may provide a relatively uniform temperature to an inside of the housing 30.

A thickness of the sheet-type heating element 40 may be in a range of, for example, about 0.1 μm to about 1000 μm, about 1 μm to about 1000 μm, about 1 μm to about 800 μm, about 1 μm to about 600 μm, about 1 μm to about 400 μm, about 1 μm to about 200 μm, about 1 μm to about 100 μm, about 1 μm to about 80 μm, about 1 μm to about 60 μm, about 1 μm to about 40 μm, about 1 μm to about 20 μm, about 1 μm to about 10 μm, about 1 μm to about 8 μm, about 1 μm to about 6 μm, about 1 μm to about 4 μm, or about 1 μm to about 2 μm. When the thickness of the sheet-type heating element 40 is too small, the sheet-type heating element 40 may deteriorate due to an excessively high temperature. When the thickness of the sheet-type heating element 40 is too large, a thermal capacity increases, and thus electrical power consumption may increase excessively.

The heating element 40 may generate heat by using electrical energy derived from the plurality of the electrodes 50 (50a and 50b).

The housing 30 may be a conductive housing 30 or an insulative housing 30. The conductive housing 30 may be a metal housing 30. The housing 30 may have a structure including a plurality of elements combined therein or integrated into one body.

Figure 4:
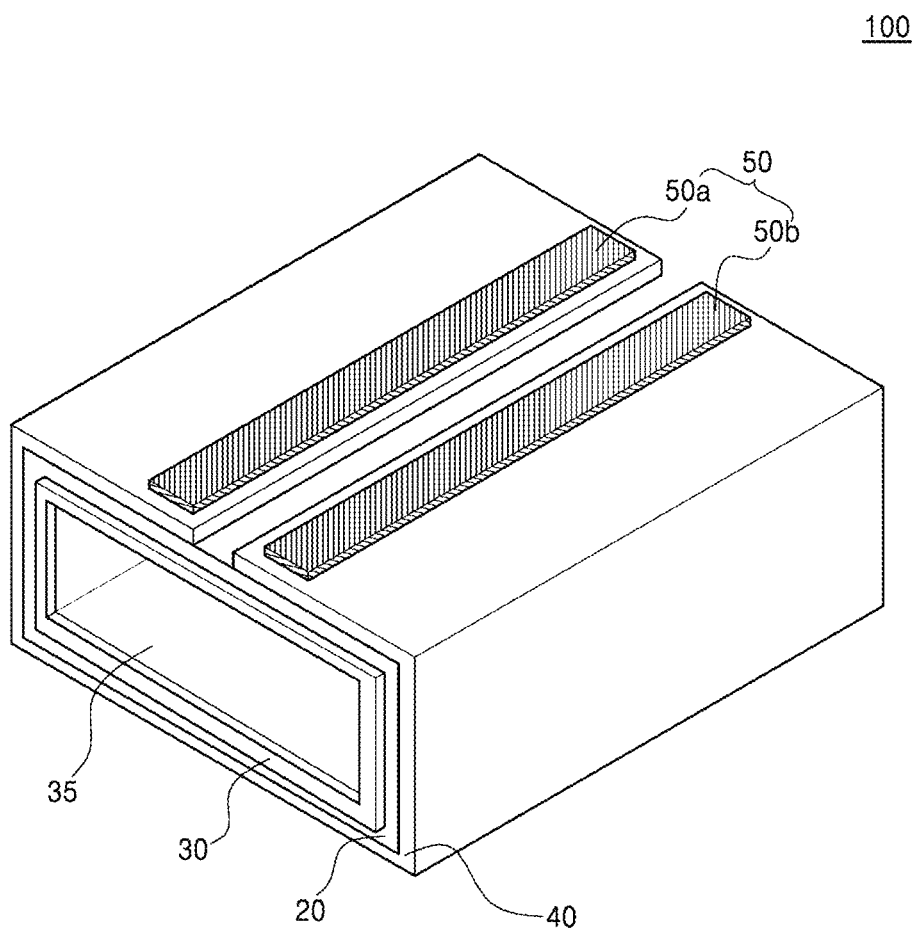
FIG. 4 is a schematic view of the charging port module for a mobile electronic device shown in FIG. 1, to which an insulating layer is added.

When the housing 30 is the conductive housing 30, as shown in FIG. 4, an insulating layer 20 may further be disposed between the housing 30 and the heating element 40. Due to the insulating layer 20, the housing 30 is electrically insulated from the heating element 40. The insulating layer 20 may include a glass frit or an organic polymer, or a combination thereof. For example, the insulating layer 20 may include a glass frit, an organic polymer, or a combination thereof, the glass frit including a same material as that of the matrix material 42. For example, the insulating layer 20 may be a polymer layer. For example, the insulating layer 20 may include a siloxane such as polysiloxane rubber or a polyimide. For example, the insulating layer 20 may be an oxide glass layer. The oxide glass layer may include a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof. The oxide glass layer may include an enamel layer.

A volume of an inner space of the housing 30 may be about 1 cubic centimeters ($cm^3$) or less, about 0.8 $cm^3$ or less, about 0.6 $cm^3$ or less, about 0.4 $cm^3$ or less, about 0.2 $cm^3$ or less, or about 0.1 $cm^3$ or less. When the volume of the inner space of the housing 30 is too large, a volume of water that may be included in the housing 30 excessively increases, and thus the electrical power required to remove the water excessively increases, which may not allow rapid water removal.

The fillers 44 having a nanostructure and the heating element 40 described above may be prepared as follows.

First, a method of preparing an oxide filler having a nanostructure will be described.

For example, a method of preparing a $RO_{(2+x)}$ ($0 \leq x \leq 0.1$) nano-sheet will be described. Fillers including other types of nanostructures may also be manufactured by using a method which is substantially the same as or similar to the method used to form the $RO_{(2+x)}$ ($0 \leq x \leq 0.1$) nano-sheet.

In order to prepare a $RO_{(2+x)}$ nano-sheet, $K_2CO_3$ and $RuO_2$ are first mixed in a molar ratio of 5:8 to prepare a mixture, the mixture is formed as pellets, and then the pellets are placed in an alumina crucible and heat-treated at 850° C. for 12 hours in a tube furnace. This heat treatment may be performed under a nitrogen atmosphere. A weight of each of the pellets may be in a range of about 1 gram (g) to about 20 g, but the weight of each of the pellets may vary according to need. A shape of the pellet may be a disc shape. After the heat treatment of the pellet, when a temperature of the tube furnace is cooled to room temperature, the alumina crucible is removed from the furnace, and the pellets in the alumina crucible are removed and pulverized into a powder. After washing the powder with about 100 milliliters (mL) to about 4 liters (L) of water for 24 hours, the powder is separated by filtering. Here, a composition of the powder thus prepared is $K_{0.2}RuO_{2.1} \cdot nH_2O$. Next, the $K_{0.2}RuO_{2.1} \cdot nH_2O$ powder is added to a 1 molar (M) HCl solution, stirred for 3 days, and filtered to separate a powder. A composition of the powder obtained in this process is $H_{0.2}RuO_{2.1}$. Subsequently, 1 g of the $H_{0.2}RuO_{2.1}$ powder is immersed in 250 mL of an aqueous solution in which intercalants such as tetramethylammonium hydroxide ("TMAOH") and tetrabutylammonium hydroxide ("TBAOH") are mixed, and the mixture is stirred for more than 10 days. At this point, the concentration of the TMAOH and TBAOH may be approximately tetramethylammonium ("TMA+")/H+, tetrabutylammonium ("TBA+")/H+=0.1 to 50. After the stirring process is completed, the mixture is subjected to a centrifugation process. The centrifugation may be performed at 2,000 revolutions per minute (rpm) for 30 minutes. Through the centrifugation process, an aqueous solution including exfoliated $RuO_{(2+x)}$ nano-sheets and a precipitate including un-exfoliated powder are separated from each other. The exfoliated $RuO_{(2+x)}$ nano-sheets obtained by the centrifugation process may include $RuO_2$ nano-sheets and $RuO_{2.1}$ nano-sheets.

Next, a volume of the $RuO_2$ nano-sheet aqueous solution is measured which includes a desired weight of the $RuO_2$ nano-sheet, and a solvent is removed from the measured volume of the $RuO_2$ nano-sheet aqueous solution using a centrifugal separator to prepare $RuO_{(2+x)}$ nano-sheets.

Thereafter, a matrix material is mixed with the resultant from which the solvent of the $RuO_2$ nano-sheet aqueous solution is removed to prepare a mixture, the mixture including the $RuO_2$ nano-sheets and the matrix material is coated on a substrate, the coated product is dried at a temperature in a range of about 100° C. to about 200° C. to remove any residual solvent from the coated product, and the coated product from which the solvent is removed is heat-treated at a temperature in a range of about 500° C. to about 900° C. for 1 minute to 20 minutes to prepare a heating element including nanostructured fillers.

A chalcogenide nano-sheet, a boride nano-sheet, or a carbide nano-sheet may be manufactured as follows.

First, a chalcogenide nano-sheet may be manufactured as follows.

Raw materials in a solid powder state are prepared. Here, the raw materials are prepared by weighing appropriate amounts to obtain a desired molar ratio. Next, the prepared raw materials are uniformly mixed, and afterwards, are made into pellets. After placing the pellets in a quartz tube, the quartz tube is filled with an argon gas and is sealed. The quartz tube in which the pellets are placed is heat-treated in a furnace at a temperature in a range from about 500° C. to about 1300° C. for about 12 hours to about 72 hours. After the heat treatment, the resultant is cooled to room temperature, and afterwards, the pellets are removed from the quartz tube and are pulverized into a powder. Lithium ions are injected between the chalcogenide layers which are in a powder state. The lithium ions may be injected between the chalcogenide layers which are in a powder state using a lithium ion source, and an example of the lithium ion source may be n-butyllithium. In some embodiments, lithium ions may be directly injected between the chalcogenide layers which are in a powder state using an electrochemical method instead of using a lithium ion source.

When lithium ions are injected between the chalcogenide layers formed in a powder state, a space between the individual chalcogenide layers increases, and thus, the chalcogenide layers, that is, chalcogenide nano-sheets, may be easily exfoliated. When the lithium ions are replaced by molecules of a larger size (for example, water molecules or organic molecules), the spaces between the chalcogenide layers may further increase. Accordingly, the chalcogenide nano-sheets may be more easily exfoliated.

As a method of easily exfoliating chalcogenide nano-sheets, after injecting lithium ions between the chalcogenide layers formed in a powder state, the chalcogenide layers may be ultrasonicated.

Boride nano-sheets may be manufactured by the following two methods.

The first method is the same as the method of manufacturing chalcogenide nano-sheets.

The second method is as follows.

Raw materials in a solid powder state are prepared. Here, the raw materials are prepared by weighing appropriate amounts to obtain a desired atomic ratio. Next, the prepared raw materials are uniformly mixed, and afterwards, are made into pellets. After placing the pellets in arc melting equipment, the pellets are melted at a high temperature using an arc. The melting process using an arc may be repeated several times until the pellets are uniformly mixed to become a single phase. After the resultant is cooled down to room temperature, the resultant is removed from the arc melting equipment and is pulverized, thereby obtaining the pellets in a powder state. Afterwards, lithium ions are injected between individual boride layers which are in a powder state. The lithium ions may be injected between the boride layers formed in a powder state using a lithium ion source, for example, n-butyllithium. Instead of using a lithium ion source, lithium ions may be directly injected between the boride layers which are in a powder state using an electrochemical method. When lithium ions are injected between the boride layers which are in a powder state, spaces between the boride layers which are in a powder state may increase, and thus, the boride layers, that is, boride nano-sheets, may be easily exfoliated. When the lithium ions are replaced by molecules of a larger size (for example, water molecules or organic molecules), the spaces between the boride layers may further increase. Accordingly, the boride nano-sheets may be more easily exfoliated.

After injecting lithium ions between the boride layers which are in a powder state, the boride nano-sheets may be exfoliated by ultrasonicating the boride layers.

Carbide nano-sheets may be manufactured in the same manner in which the boride nano-sheets are manufactured.

The graphene or the graphene oxide used as a carbonaceous material having a nanostructure may be materials commonly used in the art.

Figure 5:
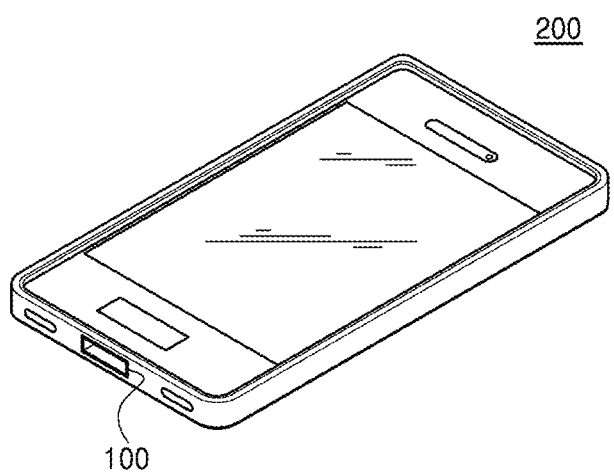
FIG. 5 is a schematic view of an embodiment of a mobile terminal including the charging port module for a mobile electronic device.

Referring to FIG. 5, a mobile electronic device 200 according to an embodiment includes the charging port module 100 for a mobile electronic device. When the mobile electronic device 200 includes the charging port module 100 capable of generating heat, water remaining in the charging port module 100 of the mobile electronic device 200 may be rapidly removed. The mobile electronic device 100 may be, for example, a smart phone, a laptop, or a tablet PC, but embodiments are not limited thereto, and examples of the mobile electronic device 100 may include all mobile terminals that include a battery, a display unit, and a control unit in the terminal itself.

For example, as shown in FIG. 5, when the charging port module 100 of a mobile phone 200 includes a heat generating function, water present in the charging port module 100 (for example, a space inside a housing) may be removed in a short period of time. Also, the charging port module 100 of a mobile electronic device is sealed except for the opening 35 (as shown in FIG. 1B, for example), and thus has a water-proof function, which may prevent water in the charging port module 100 from penetrating therethrough into the phone.

EXAMPLES

Hereinafter, one or more embodiments will now be described in more detail with reference to the following examples. However, these examples are provided for illustrative purposes only and should not be construed as limiting the scope of the one or more embodiments.

Preparation of Filler Having Nanostructure

Preparation Example 1

A $RuO_{(2+x)}$ nano-sheet (where $0 \leq x \leq 0.1$) was prepared as a filler having a nanostructure. A filler having a different nanostructure may also be prepared by using a method similar to or the same as the method of preparing a $RuO_{(2+x)}$ nano-sheet (where $0 \leq x \leq 0.1$).

In order to prepare a $RuO_{(2+x)}$ nano-sheet, $K_2CO_3$ and $RuO_2$ were mixed in a molar ratio of 5:8 to prepare a mixture, the mixture was formed into pellets, and then the pellets were placed in an alumina crucible and heat-treated at 850° C. for 12 hours in a tube furnace under a nitrogen atmosphere. A weight of each of the pellets was in a range of about 1 g to about 20 g, but the weight of the pellets may vary according to conditions of the desired result. A shape of each pellet was a disc shape. After the heat-treatment of the pellets, when a temperature of the tube furnace was cooled to room temperature, the alumina crucible was removed from the furnace, and the pellets was removed from the alumina crucible and pulverized into a powder. After washing the powder with about 100 mL to about 4 L of water for 24 hours, the powder was separated by filtering. A composition of the powder thus prepared was $K_{0.2}RuO_{2.1} \cdot nH_2O$.

Next, the $K_{0.2}RuO_{2.1} \cdot nH_2O$ powder was added to a 1 M HCl solution, stirred for 3 days, and filtered to separate a powder. A composition of the powder thus obtained was $H_{0.2}RuO_{2.1}$. Subsequently, 1 g of the $H_{0.2}RuO_{2.1}$ powder was immersed in 250 mL of an aqueous solution in which intercalants, such as tetramethyl ammonium hydroxide ("TMAOH") and tetrabutyl ammonium hydroxide ("TBAOH"), are mixed, and the mixture was stirred for more than 10 days. At this point, the concentration of the TMAOH and TBAOH was TMA+/H+, TBA+/H+=0.1 to 50. After the stirring process was completed, the mixture was subjected to a centrifugation process. The centrifugation was performed at 2,000 rpm for 30 minutes. Through the centrifugation process, an aqueous solution including exfoliated $RuO_{(2+x)}$ nano-sheets and a precipitate including un-exfoliated powder were separated from each other.

Figure 6:
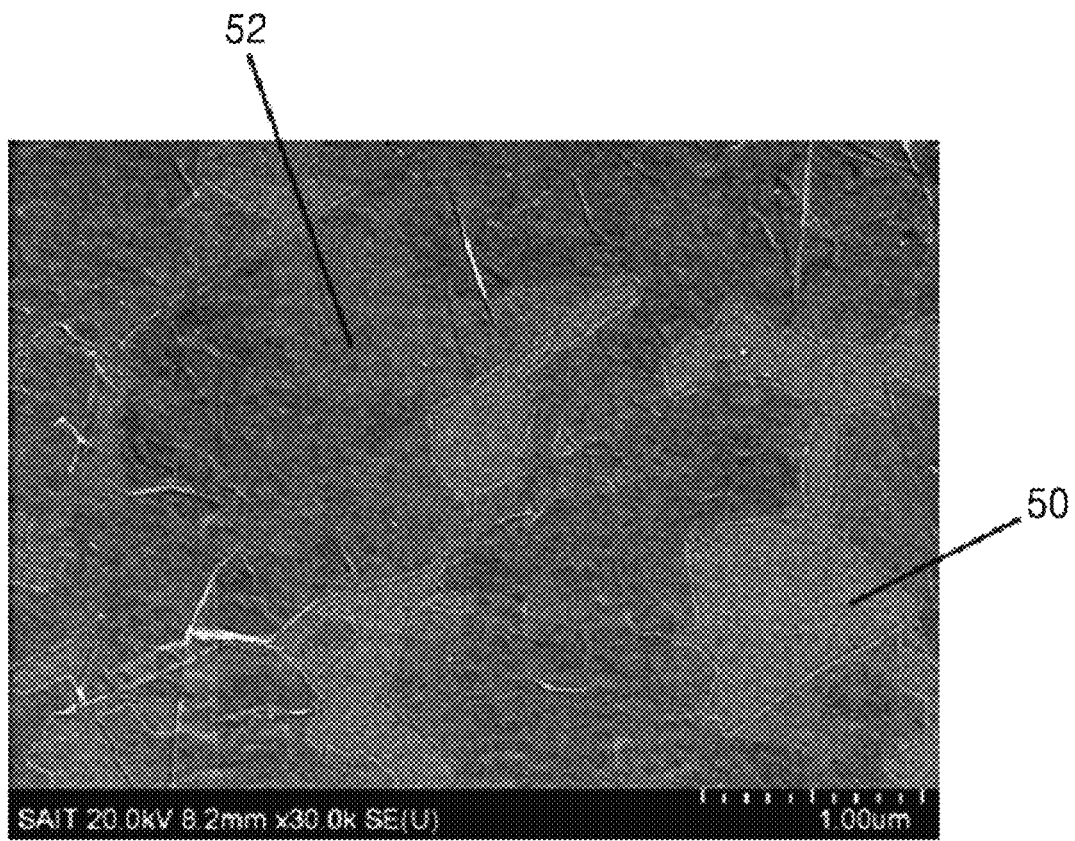
FIG. 6 is a scanning electron microscope ("SEM") image of a $RuO_{(2+x)}$, ($0 \leq x \leq 0.1$) nano-sheet prepared in Preparation Example 1.

FIG. 6 is an SEM image of the exfoliated $RuO_{(2+x)}$ nano-sheets (where $0 \leq x \leq 0.1$). In FIG. 6, reference numerals 50 and 52 respectively indicate a substrate and a $RuO_{(2+x)}$ nano-sheet. The exfoliated $RuO_{(2+x)}$ nano-sheets obtained by the centrifugation process include a $RuO_2$ nano-sheet and a $RuO_{2.1}$ nano-sheet. For convenience of description, hereinafter a $RuO_{(2+x)}$ nano-sheet is referred to as a $RuO_2$ nano-sheet.

A concentration of an aqueous solution including the exfoliated $RuO_2$ nano-sheet obtained through the centrifugation process was measured using an Ultraviolet-Visible Spectrophotometer ("UVS"). Then, an optical absorption of the $RuO_2$ nano-sheet aqueous solution with respect to a wavelength of 350 nm was measured, and the concentration (grams per liter, g/L) of the $RuO_2$ nano-sheet in the $RuO_2$ nano-sheet aqueous solution was calculated using an absorption coefficient (7400 liters per mole·centimeter (L/mol·cm)) of the $RuO_2$ nano-sheet. Next, a desired volume of the $RuO_2$ nano-sheet aqueous solution was measured, which corresponded to a desired weight of the $RuO_2$ nano-sheet, and a solvent was removed from the measured volume of the $RuO_2$ nano-sheet aqueous solution using a centrifugal separator. At this point, the centrifugal separator was operated at a speed of 10,000 rpm or above for 15 minutes or more.

Manufacture of Heating Element

Example 1

A matrix material was mixed with the resultant obtained by removing the solvent from the $RuO_2$ nano-sheet aqueous solution. The matrix material was added such that a weight content of the $RuO_2$ nano-sheet was 10 weight percent (wt %). The amount of the matrix material may vary according to the predetermined weight content of the $RuO_2$ nano-sheet. An enamel glass frit was used as the matrix material. Then, the mixture of the $RuO_2$ nano-sheet and the matrix material was coated on a metal housing by using a screen printing method. After coating was completed, the coated product was dried at a temperature in a range of about 100° C. to about 200° C. in order to remove any residual solvent from the coated product. The coated product from which the solvent was removed was heat-treated at 600° C. for 2 minutes, which sintered the matrix material and $RuO_2$ nano-sheets, and thus a heating element including a nano-material was manufactured.

Figure 7:
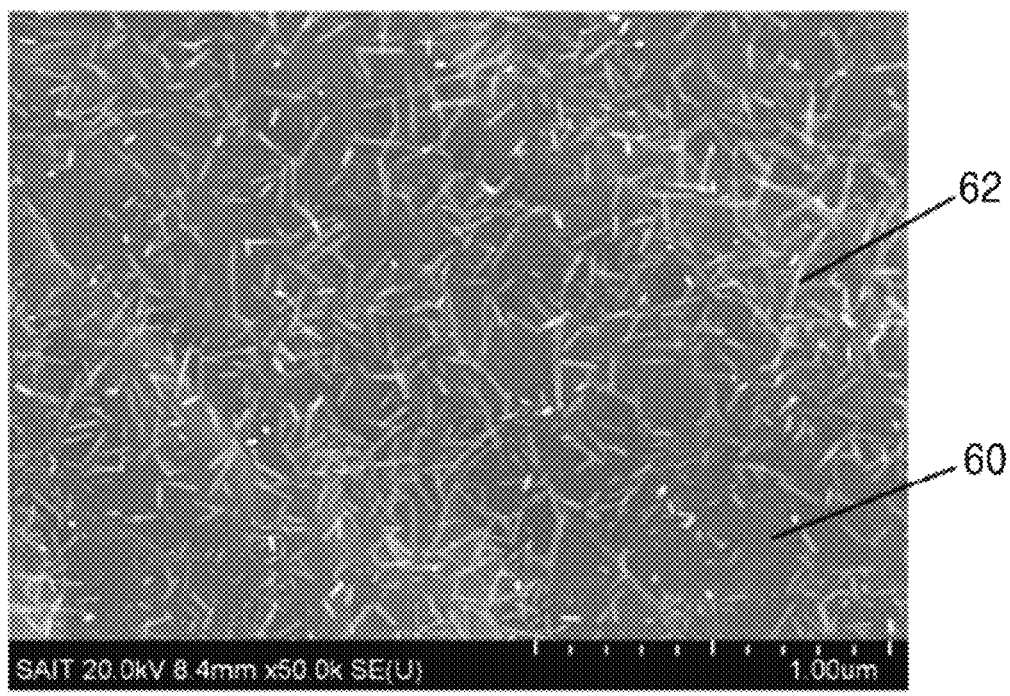
FIG. 7 is an SEM image of a heating element prepared in Example 1.

FIG. 7 is an SEM image of the heating element thus manufactured. In FIG. 7, reference numerals 60 and 62 respectively indicate an enamel glass frit as the matrix material and the $RuO_2$ nano-sheet.

Referring to FIG. 7, it may be confirmed that nanomaterial fillers 62 are uniformly distributed in a matrix material 60.

Comparative Example 1

A heating element was prepared in the same manner as in Example 1, except that $RuO_2$ particles having an average particle size of 200 nm and an aspect ratio of 2 or less, were used instead of the $RuO_2$ nano-sheets prepared in Preparation Example 1, and the heat-treating temperature and time for sintering were respectively changed to 700° C. and 5 minutes. Here, an amount of the $RuO_2$ particles in the heating element was 10 wt %.

Evaluation of Physical Properties of Heating Element

Evaluation Example 1: Measurement of Electrical Conductivity

After applying a silver (Ag) paste on opposing edges of the heating element prepared in Example 1, two electrodes were formed by drying the Ag paste. A resistance between the two electrodes was measured, and an electrical conductivity of the heating element was measured by measuring a horizontal length, a vertical length, and a thickness of the heating element. The measured electrical conductivity of the heating element was 1,358 S/m. The electrical conductivity of the heating element prepared in Comparative Example 1 was 2.93 S/m.

Generally, when a heat-treating temperature is high and a heat-treating time increases, sintering of $RuO_2$ is facilitated, and thus electrical conductivity increases.

The heating element of Example 1 had an increased electrical conductivity which was at least 300 times greater than that of a comparative heating element, in spite of having a lower heat-treating temperature and a shorter heat-treating time compared to those of the heating element of Comparative Example 1.

It is deemed that this resulted because the $RuO_2$ nanosheets included in the heating element of Example 1 exhibited improved percolation relative to the $RuO_2$ particles included in the heating element of Comparative Example 1.

Figure 8B:
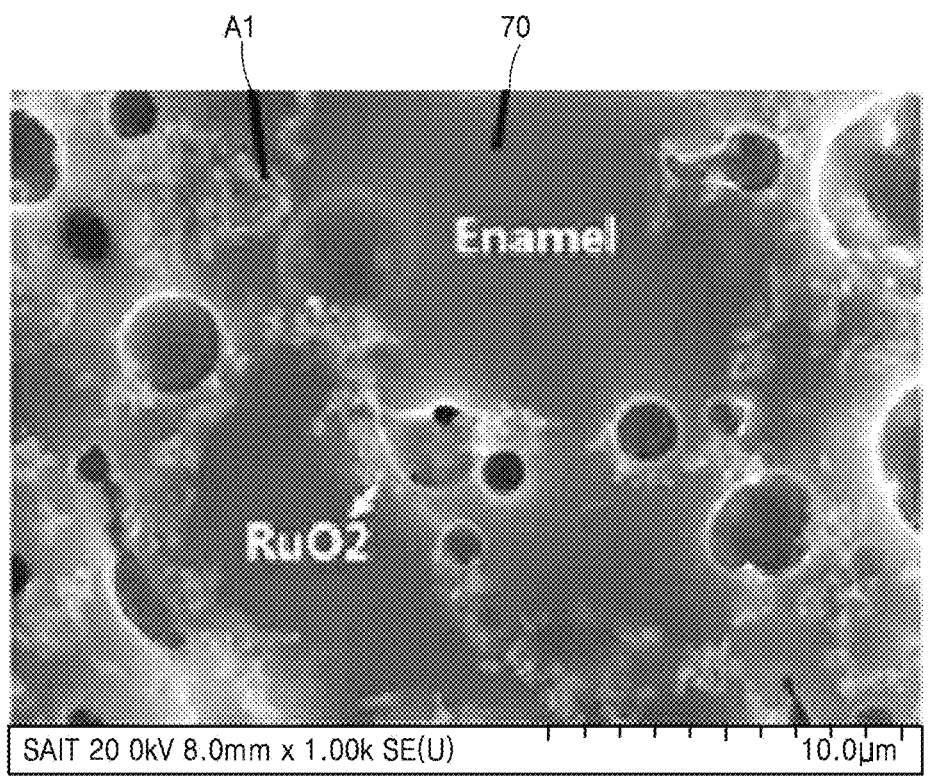
Figure 8C:
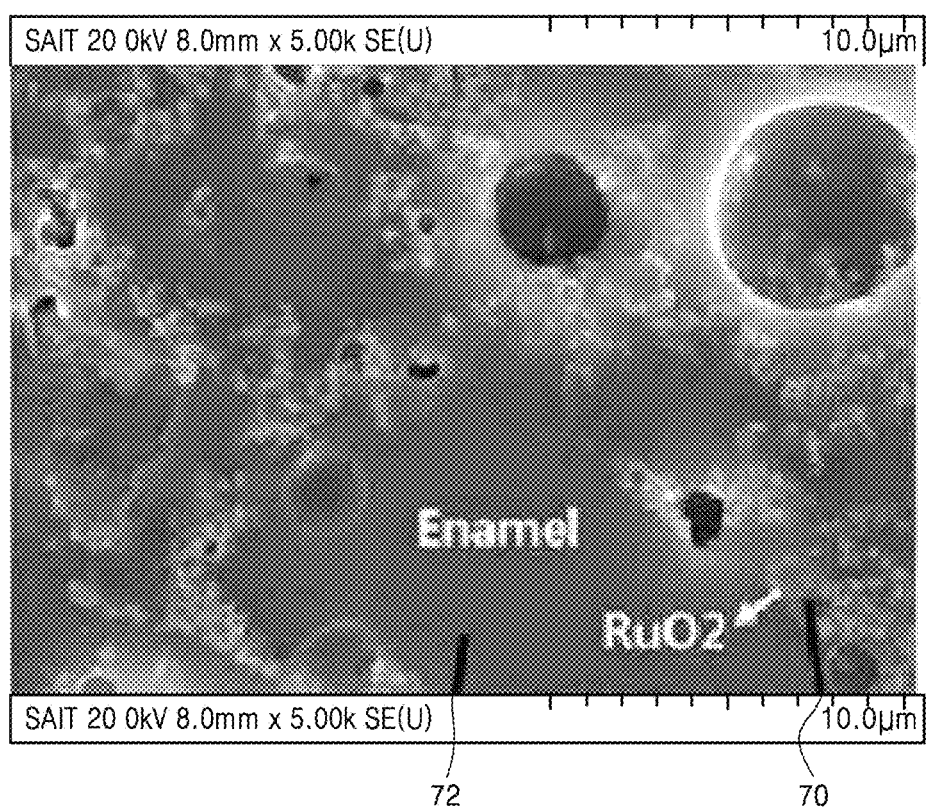

FIGS. 8A to 8C are SEM images of the comparative heating element.

FIGS. 8B and 8C are magnified views of a first area A1 and a second area A2 in FIG. 8A, respectively. In FIGS. 8B and 8C, reference numerals 70 and 72 respectively indicate enamel or a glass frit and $RuO_2$ particles. Referring to FIGS. 8B and 8C, portions free of the $RuO_2$ particles 72 exist in the glass frit 70, and the electrical conductivity of the heating element of Comparative Example 1 was lowered as percolation of $RuO_2$ was weakened due to these portions.

Therefore, it was confirmed that when fillers having a nanostructure of Example 1 are used, a sintering temperature may decrease, and an electrical conductivity may increase with the same amount of the fillers.

Evaluation Example 2: Evaluation of Water Removing Time

A commercially available Universal Serial Bus ("USB") charging port module was used, and an energy and a time needed to remove water remaining in a housing of the charging port module were calculated.

An inner volume of the housing of the charging port module was 0.088 $cm^3$.

A thermal capacity of the housing was assumed to be 0.281 J/K, and a thermal capacity of water was assumed to be 0.368 J/K. A temperature increase ($\Delta T$) for removal of water was assumed to be 100° C.

Figure 9:
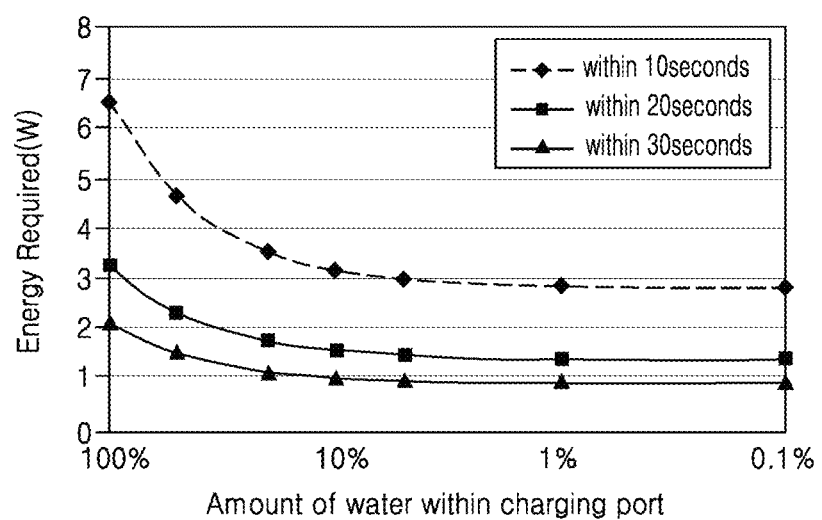
FIG. 9 is a graph that shows energy required to remove water from the charging port module within 10 seconds to 30 seconds.

Electrical powers that were needed to remove water remaining in the housing within 10 seconds, 20 seconds, and 30 seconds are shown in Table 4 and FIG. 9. Table 4 discloses data for 10 seconds.

Figure 10:
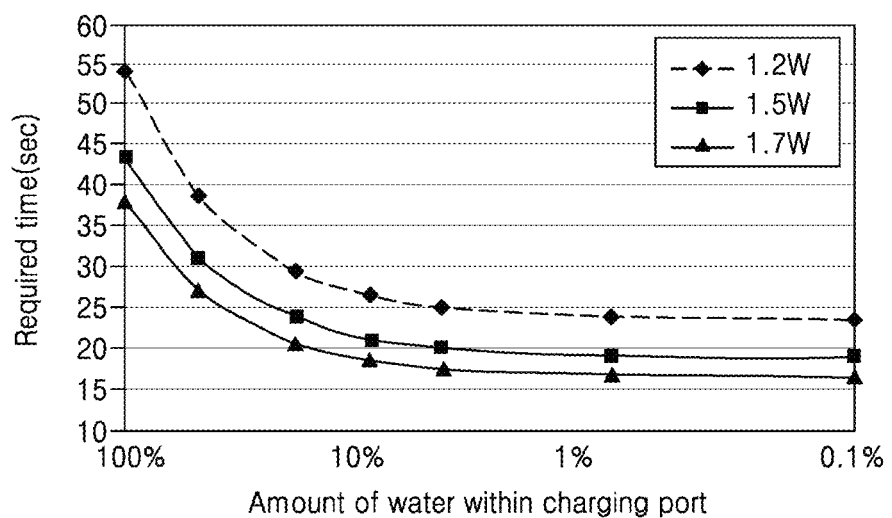
FIG. 10 is a graph that shows time required to remove water from the charging port module with an electrical power of about 1.2 watts (W) to about 1.5 W.

Periods of time that were needed to remove water remaining in the housing when electrical powers of 1.2 W, 1.5 W, and 1.7 W were applied are shown in Table 5 and FIG. 10. Table 5 discloses data for 1.2 W.

TABLE 4

| | Volume of water remaining in housing | | | | |
|---|---|---|---|---|---|
| | 100% | 20% | 5% | 1% | 0.1% |
| Consumed power [W] | 6.49 | 3.55 | 3.0 | 2.85 | 2.82 |

TABLE 5

| | Volume of water remaining in housing | | | | |
|---|---|---|---|---|---|
| | 100% | 20% | 5% | 1% | 0.1% |
| Elapsed time [seconds (sec)] | 43.3 | 23.7 | 20 | 19 | 18.8 |

As shown in Tables 4 and 5, an electrical power needed to completely remove water from the charging port module within 10 seconds was 6.49 W or less.

When an electrical power of 1.5 W was applied to the charging port module, a period of time needed to completely remove water from the charging port module was 43.3 seconds.

Therefore, when the heating element is disposed on the housing of the charging port module to heat the charging port module, water in the charging port module may be rapidly removed.

As described above, according to one or more embodiments, when a charging port module for a mobile electronic device includes a heat-releasing layer, water remaining in a charging port for a mobile electronic device may be removed in a short period of time.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A charging port module for a mobile electronic device, the charging port module comprising:
   a housing comprising at least one opening for receiving a charging cable of the mobile electronic device;
   a heating element disposed on the housing and surrounding a side surface, a bottom surface, and a top surface of the housing; and
   a plurality of electrodes contacting the heating element, wherein the heating element comprises a plurality of nanostructures, wherein the nanostructures comprise an oxide, a boride, a carbide, a chalcogenide, or a combination thereof, wherein each of the nanostructures comprises a nano-sheet, and wherein the nanostructures comprise $RuO_2$, $MnO_2$, $ReO_2$, $OsO_2$, $IrO_2$, $NbO_2$, $GaO_2$, $InO_2$, $CrO_2$, $RhO_2$, $Ta_3B_4$, $Nb_3B_4$, $TaB$, $NbB$, $V_3B_4$, $Dy_2C$, $Ho_2C$, $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$ or a combination thereof.

2. The charging port module of claim 1, wherein the plurality of electrodes is configured to have about 1 amp or lower supplied to the plurality of electrodes and about 24 volts or lower applied to the plurality of electrodes.

3. The charging port module of claim 1, wherein the charging port module is configured such that an electrical power of about 10 watts or lower applied to the charging port module for a time of about 60 seconds or less removes 99.9 volume percent or more of water introduced to an inside of the housing through the at least one opening.

4. The charging port module of claim 1, wherein a maximum temperature the housing can withstand is about 150° C.

5. A mobile electronic device comprising the charging port module of claim 1.

6. The charging port module of claim 1, wherein the heating element comprises a matrix material.

7. The charging port module of claim 6, wherein a thickness of each of the nanostructures is in a range of about 1 nanometers to about 1,000 nanometers, and a length of each of the nanostructures is in a range of about 0.1 micrometers to about 500 micrometers.

8. The charging port module of claim 6, wherein an amount of the nanostructures in the heating element is in a range of about 0.1 volume percent to lower than about 20 volume percent on a total volume percent basis of the heating element.

9. The charging port module of claim 6, wherein the nanostructures have an electrical conductivity of at least about 1,250 siemens per meter.

10. The charging port module of claim 6, wherein the heating element comprises a sheet-type heating element having a 2-dimensional surface area.

11. The charging port module of claim 6, wherein the matrix material comprises a ceramic material, an organic polymer, or a combination thereof, wherein the ceramic material comprises a glass frit.

12. The charging port module of claim 11, wherein the glass frit comprises a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof.

13. The charging port module of claim 11, wherein the glass frit comprises silicon oxide, and Li, Ni, Co, B, K, Al, Ti, Mn, Cu, Zr, P, Zn, Bi, Pb, Na, or a combination thereof.

14. The charging port module of claim 11, wherein the organic polymer comprises polyimide, polyphenylenesulfide, polybutylene terephthalate, polyamideimide, liquid crystalline polymer, polyethylene terephthalate, polyetheretherketone, or a combination thereof.

15. The charging port module of claim 11, wherein:
the matrix material comprises a ceramic material,
the ceramic material comprises a glass frit, and
the nanostructures comprise $RuO_2$.

16. The charging port module of claim 1, further comprising an insulating layer between the housing and the heating element.

17. The charging port module of claim 16, wherein the insulating layer comprises a glass frit, an organic polymer, or a combination thereof.

* * * * *